United States Patent [19]

Sheehan

[11] 4,141,045

[45] Feb. 20, 1979

[54] RANDOM SELECTION CONTROL SYSTEM FOR RECORDING TAPE CARTRIDGES

[76] Inventor: Daniel L. Sheehan, 13597 Marmont Way, San Jose, Calif. 95127

[21] Appl. No.: 769,858

[22] Filed: Feb. 18, 1977

[51] Int. Cl.² .................... G11B 5/86; G11B 15/68
[52] U.S. Cl. ................................. 360/15; 360/92
[58] Field of Search .............................. 360/15, 92

[56] References Cited

U.S. PATENT DOCUMENTS

| | | | |
|---|---|---|---|
| 3,718,906 | 2/1973 | Lightner | 360/15 |
| 3,990,710 | 11/1976 | Hughes | 360/15 |

Primary Examiner—Robert S. Tupper
Attorney, Agent, or Firm—David B. Harrison

[57] ABSTRACT

A system for making customized multiple selection, multiple track magnetic tape records is disclosed. The records are made by recording the playback of separate selections with each being provided on a magnetic tape cartridge. The system includes a playback array for receiving and selectively playing back the cartridges in an order selected to provide the customization of the record, with at least two of the cartridges being played back simultaneously. One or more tape recorders are connected to the playback array and loaded with a supply of magnetic tape sufficient to provide at least one of the custom recorded magnetic tape records. Each tape recorder receives the playback of the array and records the playback on the magnetic tape supply to provide the custom record. A control circuit operatively connects to the array and to the tape recorder for starting playback operation of the array and recording operation of the tape recorder and for automatically switching the array to the next cartridge in order in the array after each cartridge completes playback. The control circuit may include a tabulator for tabulating playbacks for each cartridge to account for royalties, and may further include variable length playback delay circuits to sequence selections of different lengths. The system may further include a plurality of multiple track tape recorders connected to the playback array for making a plurality of customized tape records simultaneously. The system may further include an automatic labeler for printing a label for each customized tape record with a listing of selections on the customized tape in the order of recording.

31 Claims, 5 Drawing Figures

RANDOM SELECTION CONTROL SYSTEM FOR RECORDING TAPE CARTRIDGES

BACKGROUND OF THE INVENTION

The present invention relates to method and apparatus for automatically recording a magnetic tape with randomly selected program units such as musical numbers. More particularly, the present invention enables a consumer to be provided with a customized tape recording which includes, for example, a group of program units arranged in an order preselected by the consumer from a bank of available program units. Some forms of the present invention will additionally provide a label for the tape recording which lists the units selected in order of recording.

The commercial recording industry, while it has been highly successful, has been plagued by a number of herefore unsolved limitations and drawbacks. For example, the musical tastes of consumers change very rapidly, which makes it very difficult for recording companies to decide accurately the type and quantity of entertainment material to provide. At the point of sale at the retail level, these limitations have resulted in insufficient availability of desired material and at the same time an overabundance of material which has not come into popular demand or which has become stale and may be sold, if at all, only well below cost.

Entertainment numbers are typically initially promoted and popularized by broadcasts and live performances. Usually the consumer shops for records with a specific selection in mind. While singles of the selection may be available in disc record form, they are usually not available in tape format. Also, many record albums contain only one or several songs which the consumer truly enjoys and wants, but which include other songs which the consumer does not wish to purchase but must. This monumental lack of choice in prerecorded long playing tapes has lead consumers to buy blank tape in substantial quantities and duplicate illegally vast quantities of copyrighted material from recordings or from broadcast transmissions. Such practices of creating custom tape recordings not only deprives artists and composers of the royalties to which they are entitled, it is a time consuming and laborious project for the consumer and one which has often produced less than satisfactory results.

Still this problem has not been solved by any new consumer appliances. A variety of multiple-cartridge playback units have appeared for consumer use in the marketplace. They have the same drawbacks and limitations as record players for LP records: that is, each tape is played through entirely before the next tape is up for play. Alternatively, juke boxes are equally unsuited for home and car uses. They are bulky and have to be loaded and reloaded with single disc recordings periodically. Moreover, once disc recordings are discarded, they are essentially wasted and have no practical salvage value or capability of being rerecorded with new program material.

Several systems have been proposed in the past for providing customized tape recordings. One example is found in U.S. Pat. No. 3,718,906 to Lightner. Therein a coin operated remote vending machine addressed a master tape system at a central location via a picture phone wide band telephone line (a system not widely installed in the United States or elsewhere). The master tape system played selected tape recorded programs back to the remote vending unit which thereupon transferred the programs onto a blank cartridge and delivered the custom cartridge to the consumer at the end of the recording operation. Such a system was highly impractical from many aspects. It required all playback to be at a central location, transmission to remote locations via wideband communications paths, and recording to be at each remote location. That system required unique, complex and expensive equipment, that could not easily be maintained without a fleet of mobile maintenance stations and technicians. Also, the Lightner system omitted entirely any provision for labelling the cartridges with a list of the selections recorded thereon in the order of recording. Without such a label, the customer had to come up with his own label or simply try to remember from time to time what his custom selections had been. Thus, those prior systems, such as the one shown in the Lightner patent, did not provide any practical answer to the consumer's desire for custom tape recordings.

OBJECTS OF THE PRESENT INVENTION

An object of the present invention is to provide a manufacturing system for the automatic production of tape recordings from a bank of available numbers in ways that overcome the limitations and drawbacks of the prior art.

Another object of the present invention is to enable a record company to make available to the consuming public the latest entertainment numbers while producing an optimum number of recorded tapes, a number closely tied to actual demand.

Another object of the present invention is to enable retailers to make custom tape recordings without having to maintain a large inventory of prerecorded records and tapes.

Yet another object of the present invention is to provide the consumer with prerecorded entertainment programs of only those selections desired by the consumer, thereby reducing and even eliminating waste of records and tapes.

Yet another object of the present invention is to provide reproduction accountability to reduce the problem of illegal copyright infringement of broadcast and prerecorded material arising from widespread home recording and thereby return to artists and composers the royalties they rightfully should receive.

A further object of the present invention is to provide a custom tape recording of multiple selections that includes a label.

A still further object of the present invention is to provide automatic selectable-length time delays for synchronizing selection recording starting times so as to handle selections of differing lengths.

SUMMARY OF THE INVENTION

These and other objects and advantages of the present invention are accomplished by a system which includes a bank of multiple tape cartridges, each prerecorded with a different single unit program of entertainment. The cartridges are installed in a playback matrix which plays back selected ones of the cartridges in a predetermined sequential order for multiple track custom tape recordings. The playback matrix plays back selected cartridges simultaneously so that all tracks are recorded with one pass. The program units are either timed to be substantially the same length or a variable length delay may be provided for each program channel to be recorded. A tape recorder is connected to the playback matrix and is loaded with a single quantity of magnetic tape which is to be recorded with the predetermined sequence of unit programs. A container is also provided for the magnetic tape after it has been recorded. The container may be a tape cassette or an eight track cartridge or a reel, etc. Alternatively, the tape recorder could be adapted to receive a preloaded cassette, eight track cartridge, or reel. A controller is provided which is connected to control the playback matrix, the tape recorder and the delay. The controller energizes and connects selected playback units of the matrix and sends the audio playback signals therefrom to the recorder in the preselected sequence while the recorder records the received programs on the tape. The controller may also tally playbacks for royalty accounting. The system may include an operator terminal connected to the controller for selecting the identification and order of the tape cartridges having the different single entertainment units which are to be placed onto the tape. An output printer may also be connected to the controller for printing the label for the tape container which lists the program units in the order selected. The label may then be affixed to the tape container before or after the tape therein is custom recorded with the programs listed thereon, and the label printer may also print a mailing label for automatic affixation to a mailing jacket so that an automatic production and mailing system is thereby provided. The printer may also be utilized to print out the playback tally for each program unit.

The method of the present invention includes the steps of providing each of a plurality of tape cartridges with a different single unit program of entertainment, loading the prerecorded tape cartridge into a playback matrix; loading a supply of unrecorded magnetic tape into a tape recorder; connecting the tape recorder to the playback matrix; automatically playing back selected cartridges in a predetermined order and simultaneously recording the playback therefrom onto multiple tracks of the tape in the tape recorder. The method may also include automatically typing a label for the magnetic tape in the tape recorder which identifies in sequence the program units recorded thereon and affixing the printed label to the magnetic tape recorded by the recorder.

The method may comprise the additional step of providing a mailing label for application to a mailing wrapper for a recorded tape so that it may be delivered through the mail to the consumer ordering it. The method may comprise the step of tabulating the total member of playbacks of each cartridge so that royalties may be computed and paid. The method also may comprise the step of providing one of multiple tape recorders simultaneously connected to the matrix with a playback delay for delaying a playback to accomplish simultaneous recording of selections having different time durations.

DETAILED DESCRIPTION OF PREFERRED EMBODIMENTS

High Volume Custom Tape Production and Labeling System 10

Figure 1:
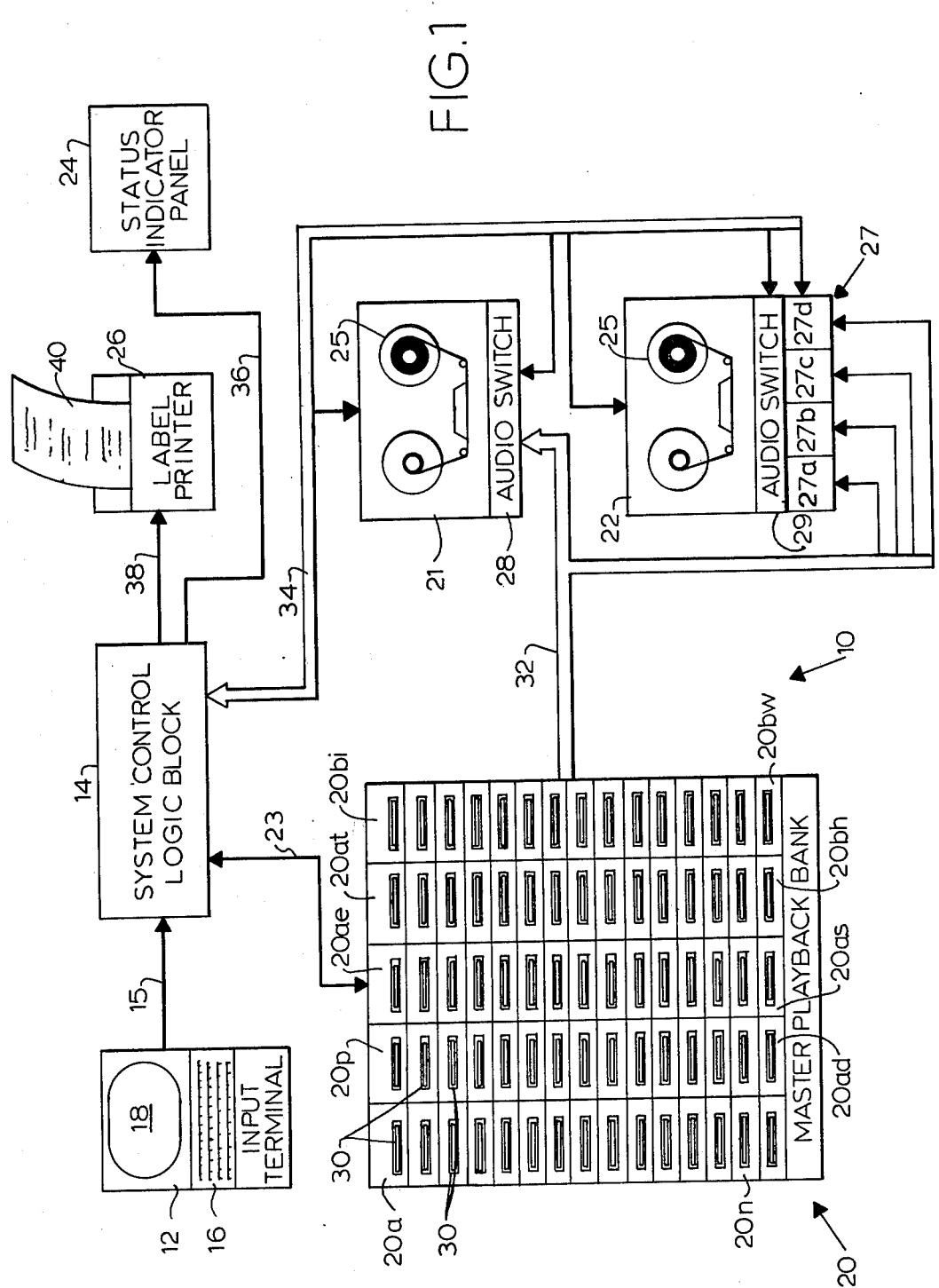
FIG. 1 is an overall system block diagram of a large volume random selection recording and labelling system incorporating the principles of the present invention.
Figure 2:
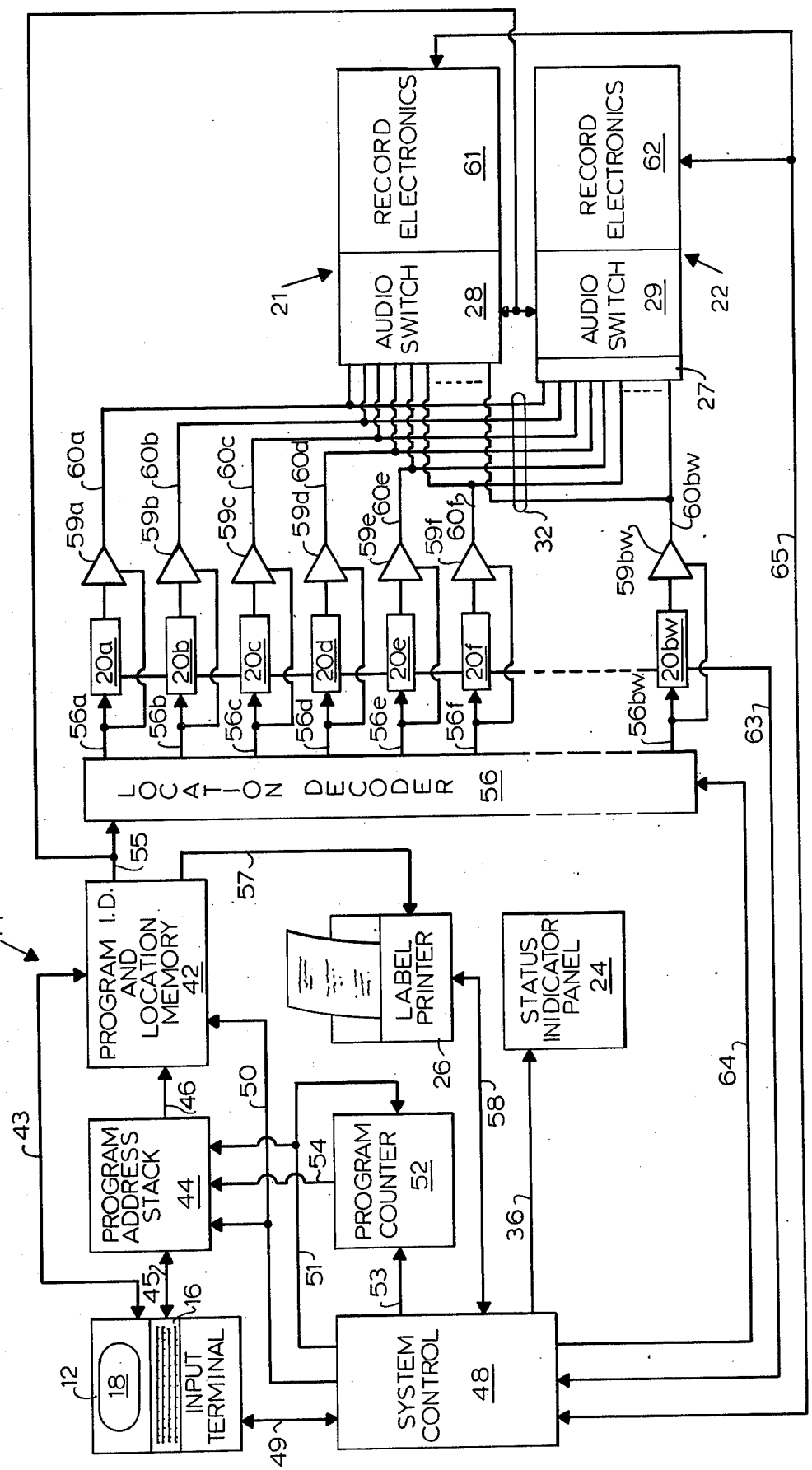
FIG. 2 is a detailed block and schematic diagram of the system of FIG. 1.
Figure 3:
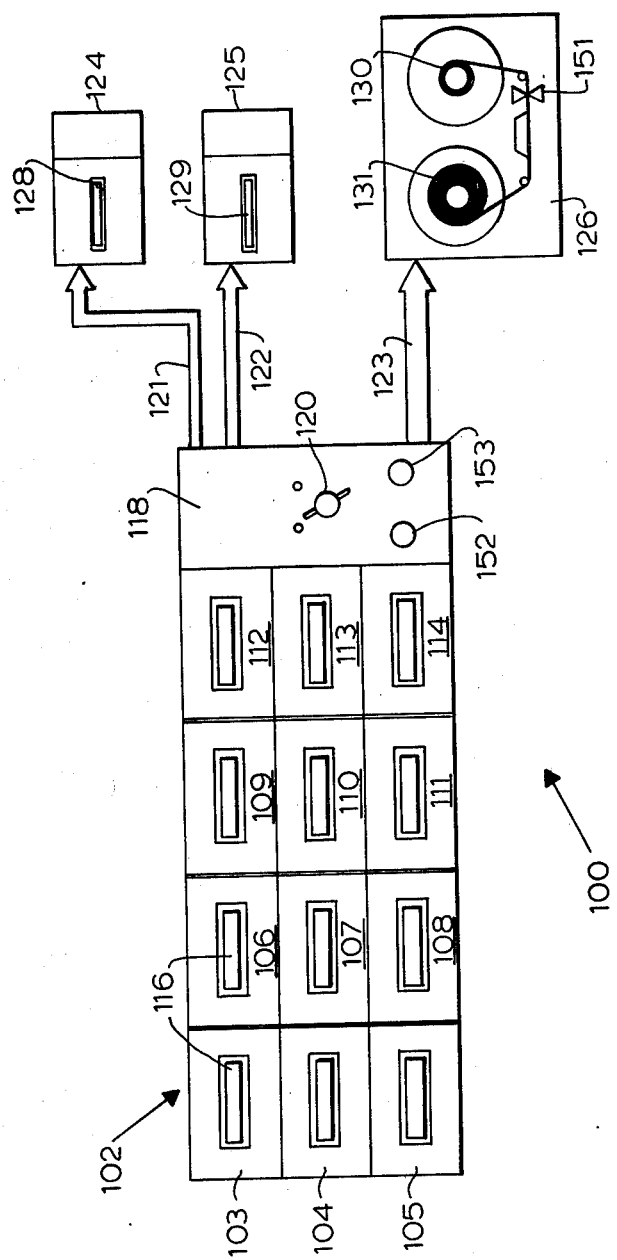
FIG. 3 is a somewhat diagrammatic view in front elevation of a low volume custom tape recording system incorporating the principles of the present invention and particularly well suited for point of retail sale custom tape production.
Figure 4:
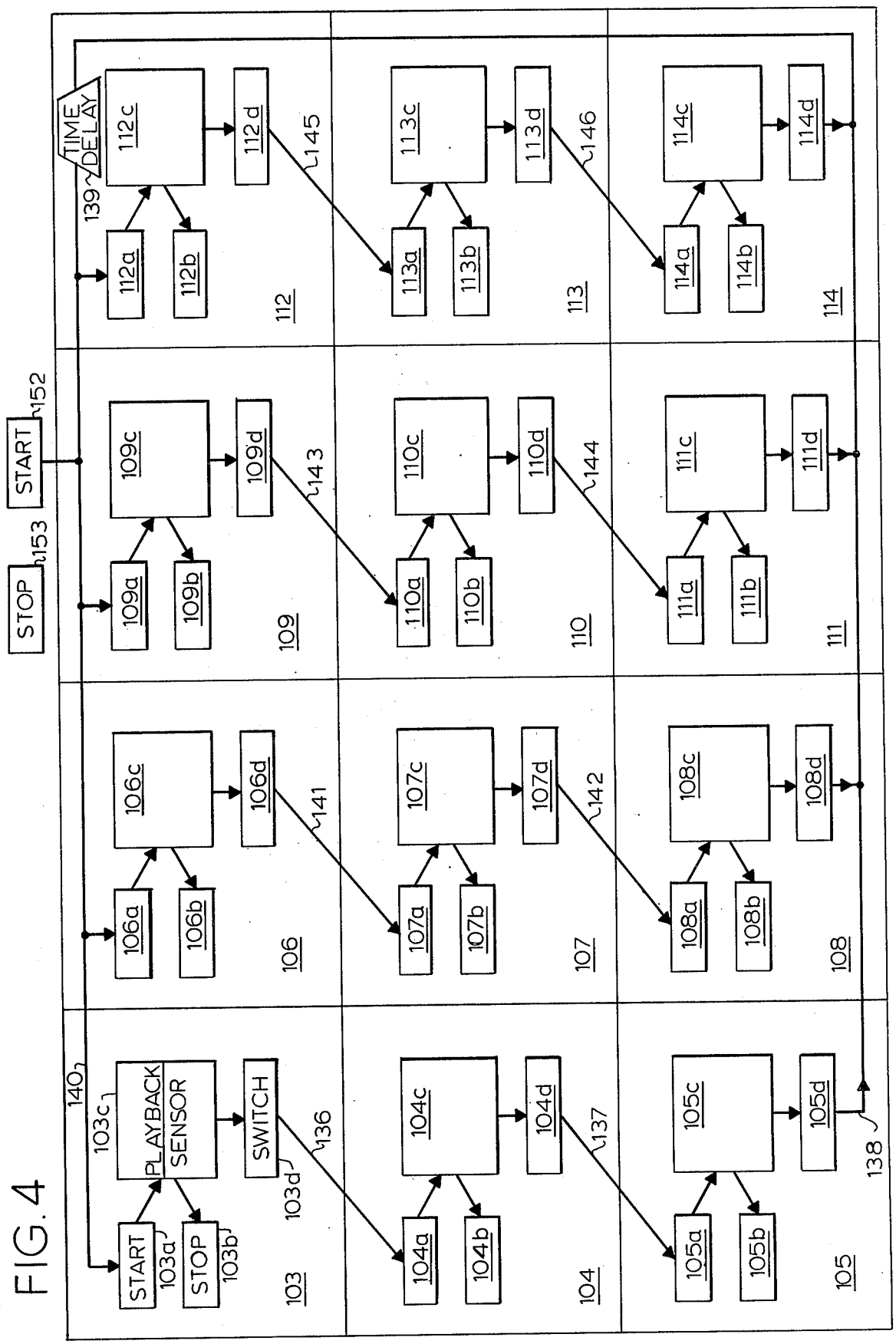
FIG. 4 is a detail block diagram of the control circuitry of the system of FIG. 3 configured for production of custom eight-track tape cartridges.

A random selection recording and automatic label printing system 10 incorporating the principles of the present invention is shown in FIGS. 1 and 2. FIG. 1 is a simplified presentation of the system 10 and illustrates its six major functional elements while FIG. 2 presents the system 10 in greater detail. The system 10 is preferred for high volume production of customized tape recordings at a central duplication facility. A much smaller system 100, shown in FIGS. 3 and 4, is preferred for lower volume point of sale production of customized tape recordings in retail record shops.

An input terminal 12 is connected to a system control logic element 14 via a cable 15 and enables an operator to provide the system 10 with the necessary information for operation. The terminal 12 has an operator keyboard 16 which preferably follows the layout of a standard typewriter. A video screen 18 may be included in the terminal 12 to enable the operator to read the information then being sent to the system 10 at the keyboard 16 as well as to read information being sent from the system control logic block 14. The terminal 12 is used first to load into the system control logic block 14 the textual description and playback address of each musical program selection available for playback in providing a customized tape recording product. The terminal 12 is thereafter used to program the system control logic block to select at random some of the available musical selections for sequential playback during the recording of the customized tape product. The terminal 12 is also used to program and control the work flow of the system 10 in making customized tape records.

There are other devices connected to the system control logic block: a master playback matrix 20, slave recorders 21 and 22, a status indicator panel 24, and a label printer 26.

The master playback matrix 20, which is connected to the system control logic block 14 via a cable 23, comprises an array of individual playback units arranged by columns and rows. The matrix 20 shown in FIG. 1 accommodates seventy five broadcast style tape cartridges 30 (NAB size A or B) in five vertical rows with fifteen cartridges 30 per row. The matrix 20 may easily be larger or smaller, depending upon the number of program selections and the number of playback units to be served simultaneously. The matrix 20 shown in FIG. 1 is preferably made up of twenty five three cartridge reproducers, such as the 3D series reproducer manufactured by International Tapetronics Corporation, 2425 South Main Street, Bloomington, Ill. 61701, or equivalent. These reproducers are solenoid controlled and provide a plurality of playback tracks, as well as stop and control cue signals. Each playback reproducer has its own playback amplifier and control circuitry. While the bank 20 is described as a five column, fifteen row cartridge playback matrix, it may alternatively be assembled from other playback reproduction units, such as eight track cartridge, cassette, or reel-to-reel reproducers or a combination thereof. Playback velocities will be much faster than will ordinarily obtain during playback of a tape by a consumer, with speeds preferably being about sixty inches per second. These high speeds enable custom tapes to be produced much faster, and therefore in greater quantities, than if playback reproductions were at conventional low speed.

Each of the cassettes 30 is prerecorded with an entertainment unit such as a musical selection. Typically, the selection would be prerecorded stereophonically on two tracks of the tape in the cassette 30. Other recording tracks would be available on the cartridges 30 for control signals such as cue tones, etc. In some circumstances it is desirable to prerecord an entertainment unit into a cartridge in both forward and reverse directions. In the production of multiple selection cassette tape records, simultaneous recording of of all four audio tracks thereof requires that the program units for two of the tracks be recorded in reverse. Prerecording the entertainment unit in the cartridge 30 in two directions thereby enables reverse matrix playback and recording of two tracks of a customized cassette record simultaneously with forward matrix playback and recording of the other two tracks of the record. The playback heads of the matrix 20 may have sufficient tracks to accommodate simultaneous forward and reverse playback, as well as cue tone, should that situation be desired in operation.

The slave recorders 21 and 22 are shown as reel-to-reel machines, which are generally preferred for the production of spliced eight track custom cartridges. Tape 25 for each cartridge is recorded while in "pancake" form, i.e., coiled on a hub but without a reel, then loaded into a suitable cartridge container with its ends then being spliced together. I prefer to use a high quality machine for the slave recorders 21 and 22; a Model 280 B transport and electronics manufactured by Scully/Metrotech division of Dictophone Corporation, 475 Ellis Street, Mountain View, Calif. 94043 works well. While the Scully machine is preferred as a reel-to-reel recorder, other forms of recorder units will work satisfactorily as the slave recorder 22; for example, cassette, cartridge, floppy disc and video disc type machines will work, if desired.

Audio program material is delivered from the master playback matrix 20 to the slave recorders 21 and 22 via an interconnecting cable 32. A bidirectional control bus 34 between the slave recorders 21 and 22 and the system control logic block 14 enables the control logic to start each recorder 21, 22 and to inhibit playback by the master playback bank 20 in the event that the recorders 21 and 22 are not ready to record.

All audio program material being played back is delivered to each recorder 21, 22 via the cable 32. The programs are available to each recorder 21, 22 at the same time so that they may be recorded simultaneously by both recorders, if that is desired in the making of custom tape records. In practice, popular musical selections typically have a duration of about two to three minutes, with variations therebetween.

In making customized tape records with the system 10, differing durations of selections would result in overlaps of selections or undesirable pauses between selections on the final customized tape record product. Consequently, either the selections prerecorded on the cartridges 30 will all be arranged or edited to uniform duration or variable delays will have to be provided at one of the recorders 21 or 22. A suitable delay 27 is indicated in conjunction with the tape recorder 22. The delay 27 is shown as four blocks 27a, 27b, 27c, 27d, with each block 27a–d accommodating one of four audio channels (each being a two track stereo channel) supplied to the recorder 22 from the audio cable 32. A control line from the control block 14 to each unit 27a, 27b, 27c, 27d is included within the bidirectional control bus 34.

Each delay unit 27a, 27b, 27c, 27d, is implemented as a variable duration delay whose duration is controlled by the system control logic block 14. The length of the delay for each unit will be a direct function of the timing and duration of the immediately preceding selection sent through its channel and recorded by the recorder 22. The physical implementation of each unit of the delay 27 may be with solid state analog memory or digital conversion and memory devices, or may be separate record and playback tape mechanisms threaded with a common tape, with the length of tape between the mechanisms varying in accordance with the delay required.

Audio switches 28 and 29 at each recorder 21, 22 are operated by the system control 14 to select the correct program material for their respective recorders 21 and 22 from all of the playback channels available on the interconnecting cable 32 from time to time. While the system 10 is illustrated in the figures with two slave recorders 21 and 22, it is to be understood that more slave recorders may be accommodated simultaneously, preferably about twenty. Each recorder of an expanded system would be provided with an audio delay, if the available selections are not of the same playback duration.

The system 10 may include the status indicator panel 24, or this may be omitted: it provides an operator with visual indicators which relate operating status of the system 10 from time to time. The panel 24 may be a part of the input terminal 12, a part of the system control logic block 14, a part of the master playback matrix 20, or an entirely separate panel, etc. Moreover, some of the indicators may be a part of the input terminal 12 while others may be part of the playback matrix 20, and so forth. As shown in FIG. 1, the status indicator panel 24 is connected to the system control logic block 14 via a cable 36. While not essential to functionality, the indicator panel 24 conveniently provides the operator with valuable information, such as which playback units are playing back at any given time, which programs are being recorded by the recorders 21 and 22, or in the event of a failure, at which locations the failure has occurred.

The label printer 26 is an electromechanical printing unit which is connected to the system control logic block 14 by a line 38. The printer 26 is loaded with, e.g., a roll of continuous paper label forms 40 in conventional fashion, and it automatically prints each label with the names of the musical selections in the order in which they are being recorded to provide the customized tape product. Preferably, the labels 40 are coated on the backside with a pressure sensitive adhesive and carried on a continuous waxed paper backing sheet while in the printer. Thereafter, each label is easily peeled away from the backing sheet and adhered by application to the cartridge or tape container of the customized tape product to which it corresponds. Identifying code numbers may appear on the labels and the cartridges or containers for match up by operators, so that each customized tape record receives the correct custom label.

FIG. 2 illustrates diagrammatically one architecture for the system control logic block 14. Although other operating elements and interconnections may be utilized, the functional requirements of the system control logic block 14 remain essentially the same: to receive from the terminal 12 and store the list of musical selections to be custom recorded, to select and control in the proper sequence and playback units carrying the musical selections as well as the slave recorders 21 and 22 and their audio switches 28 and 29, to operate the label printer 26 to list on the label the names of the musical selections being custom recorded by the slave recorder 22, and to provide suitable status signals to the indicator panel 24.

In an expanded system 10, the system control logic block 14 may additionally analyze all of the lists of customized tape records to be made during a production interval such as one day and determine the most efficient order of production. Loading and reloading directions of the playback matrix 20 would be specified at the screen 18 of the operator terminal 12 during the production interval so that the system 10 would be able to provide many more selection offerings beyond the number of units of the playback matrix 20.

The system control logic block 14 shown in FIG. 2 includes a program identification and location memory 42 which stores data providing identification and location for each musical selection available for playback in the system 10. The memory 42 may be a random access read/write memory (RAM) having sufficient capacity to store all of the data needed to identify the name, e.g., by song title, and location of each musical selection for one custom tape product. Preferably the memory 42 will have sufficient capacity to hold the data for many custom tape products. The memory 42 is initially loaded with data directly from the input terminal 12 via a bidirectional data and address bus 43.

Also connected to the terminal is a program address stack 44 which is made up of interconnected registers. The stack is directly accessed by the terminal 12 via a bidirectional address data bus 45. The program address stack 44 is loaded with the addresses of the identification and location data for the musical selections to be assembled into each custom tape recording. The program address stack will have capacity for holding the addresses of the selections for at least one custom tape product, and preferably it will hold addresses for a number of such custom products. The program address stack 44 is connected to the program identification and location memory 42 via an address bus 46.

The system control logic block 14 also includes a system control circuit 48 which is connected to the terminal 12 via a bidirectional bus 49. Control signals, such as start playback/record, are sent from the terminal keyboard 16 to the control circuit 48 via the bus 49. Read/write control lines 50 extend from the system control circuit 48 to the program address stack and also to the program memory 42. These lines 50 send control signals received from the terminal 12 to the stack 44 and memory 42 to switch from read to write to read, etc., operational modes. A reset/clear line 51 interconnects the system control 48 and the program address stack 44, and enables the stack 44 to be cleared or reset.

The system control 48 is connected to a program counter 52 via a bus 53. The program counter 52 is in turn connected to the program address stack 44 by a stack count bus 54. During playback/custom tape recording operations, the program counter 52 counts down the program address stack and sends each address stored therein to the memory 42 where the address controls the memory and locates the musical selection identification and location data stored therein. The reset line 51 is also connected to the program counter 52 to clear and reset it.

The memory 42 may be provided with additional storage capacity so that other data may be placed therein. For example, the name and address of the purchaser of the custom tape may be stored in the memory 42 via the input terminal 12. This information would be sent to the label printer where the name and address may be placed on the cartridge label to provide a personalized custom tape product and may also be typed on a separate label for affixation to a suitable mailing or shipping container.

There are at least two data outputs from the program identification and location memory 42, a location data bus 55 which is connected to a location decoder 56, and an identification data bus 57 which is connected to the label printer 26. A bidirectional label print control bus 58 interconnects the printer 26 and the system control 48 and operates the printer when identification data is being sent from the memory 42 via the identification bus 57.

The location decoder 56 is electrically connected to each of the seventy five separate playback units of the master playback bank 20. In FIG. 2, although only seven of the units 20a, 20b, 20c, 20d, 20e, 20f, and 20bw are shown, it is to be understood that the decoder 56 has a separate output line for each playback unit. Thus a line 56a connects to a playback unit 20a, a line 56b connects to a playback unit 20b, a line 56c connects to a playback unit 20c, a line 56d connects to a playback unit 20d, a line 56e connects to a playback unit 20e, a line 56f connects to a playback unit 20f, and other lines connect to other units down to the last line 56bw which connects to the seventy fifth playback unit 20bw. The lines 56a–56bw operate solenoids in the playback units which automatically enable them to start, operate, and stop in the playback mode. An audio output from each playback unit 20a–20bw is passed through an audio gate, there being a gate 59a, 59b, 59c, 59d, 59e, 59f . . . 59bw for each playback unit. A control line for each gate 59a–59bw may be connected to the decoder output line for the particular playback unit. In this way an enabling signal from the decoder 56 not only actuates the tape transport solenoid of a selected playback unit, it also enables the audio gate connected at the audio output of the playback electronics of the selected playback unit.

Each audio gate 59 has an audio output line 60; thus the gate 59a has a line 60a, the gate 59b has a line 60b, 59c has a line 60c, the gate 59d has a line 60d, the gate 59e has a line 60e, the gate 59f has a line 60f, and so forth, down to the last gate 59bw which has a line 60bw. Together the lines 60a–60bw make up the interconnecting cable 32, shown in FIG. 1.

Each of the lines 60a–60bw is connected to each of the audio switches 28 and 29 of the slave recorders. Each switch 28, 29 containers a decoder, similar to the location decoder, which receives enabling signals from the program memory 42 via the location bus 55. The switch 28, 29 then selects the lines 60a–60bw which carry the program material then needed at the particular recorder 21, 22 to provide the customized tape product.

At the end of playback of each group of simultaneous playback selections, the playback units 20a–20bw and the audio switches 28, 29 are changed, in accordance with the next group of selections to be simultaneously played back and recorded. The audio delay 27 at the recorder 22 will accommodate for varying durations of non-time-equalized selections in the matrix 20.

Each slave recorder 21, 22 includes a record electronics section 61, 62 which is connected to the audio switch 28, 29, and which controls the operation of the recorder 21, 22.

Each playback unit of the matrix 20 includes circuitry for detecting the cue tones on the prerecorded tape cartridges 30 loaded therein. These cue tones are important to the successful operation of the present invention in that a cue tone announces completion of playback of a prerecorded selection by a playback unit. The cue tone thus provides a control signal to increment by one the program counter 52 which then advances the system 10 to the next selection to be played back. The cue tone outputs from the playback units 20a–20 bw are connected together into a cue tone bus 63 which is connected to the system control circuitry 48. The control circuitry 48 responds to each received cue tone by sending an incrementing pulse to the program counter 52 via the line 53, until the entire preselected custom program of prerecorded musical numbers has been assembled into the custom tape recording at the slave recorder 22. Other cue tones may provide identification of different selections or selections of different running times which are prerecorded on the cartridge loaded into the particular playback unit providing the cue tone on the line 63. In this way, the system 10 can accommodate a very large bank of prerecorded numbers, a bank well in excess of the seventy five playback units shown. It will be clearly understood by those skilled in the art that there need not be seventy five playback units in the master playback bank 20, and a lesser or greater number will be selected in accordance with the number of choices and combinations of musical selections to be handled by the system. Regardless of the number of playback units actually selected, the principles of the present invention remain the same.

A decoder latch control line 64 interconnects the system control 48 and the location decoder 56. This latch line 64 passes latch pulses to the decoder for the purpose of holding the decoded playback unit selection signal for the duration of playback. After playback has been completed, as signalled by an appropriate cue tone, then the system 10 advances to the next selection group and the location for the playback units having these next selections are latched into the decoder 56 and held for the duration of playback thereof.

A bidirectional control line 65 interconnects the system control 48 and the slave recorders 21 and 22 for the purpose of controlling the tape transport and record electronics 61 and 62 thereof, and to enable monitoring of the operation of each slave recorder 21, 22.

The input terminal 12, the system control logic block 14, the status indicator panel 24, and the label printer 26 may be implemented as hard wired units dedicated to provide the random selection control system 10. Alternatively, these four elements 12, 14, 24 and 26 may be implemented within a general purpose digital computer system. An International Business Machines System 7 will easily accomplish the direct switching and control functions of the system control logic block 14 and would be programmed to provide the control elements such as the memory 42, program address stack 44, system control 48, and location decoder 56 shown in FIG. 2. For the input terminal 12, the label printer 26, and perhaps the status indicator 24, an International Business Machine System 3 would work well. The System 3 directly interfaces with the System 7, and these two computers work well together. Alternatively, an IBM System 32 could be interfaced with the System 7 via the recorded floppy diskettes which would be recorded at the System 32 and read at the System 7.

DESCRIPTION OF SYSTEM OPERATION

Before the system 10 is able to provide custom tape recording products, it is necessary to load the master playback bank 20 with prerecorded cartridges 30, each cartridge containing at least one preselected musical number or other program unit. Each unit 20a–20bw of the seventy five unit master playback bank 20 is given a location code, and the name of each selection on the cartridge 30 as well as the location code for the unit 20 holding the cartridge 30 is typed as data input on the input terminal keyboard 16 and stored in the program identification location memory 42. After the master playback bank 20 is loaded with prerecorded cartridges 30, blank tape is threaded onto the slave recorders 21 and 22, and label forms are loaded into the label printer 40. Then the system 10 is ready to receive the first lists of custom selections which are sent via the input terminal keyboard 16 to the program address stack 44. Once the program lists are stored in the program address stack, the system is ready to be energized and from an appropriate signal key on the keyboard, a start control signal flows via the cable 49 into the system control. At that moment, the system control starts the slave recorders 21 and 22 via a signal on the line 64 and addresses the memory 42 via the program address stack 44. The memory 42 provides as an output on the line 55 the location information to the location decoder which decodes the information received and activates a group of selected playback reproducers 20. The solenoids of the selected reproducers are energized via signals from the lines 56, the audio gates 59 are opened and playback audio from the reproducers 20 are sent via the audio bus 32 to the audio switches 28 and 29 of the slave recorders 21 and 22.

The audio switches 28 and 29 then select the desired audio signals from the audio lines 60 in accordance with selection information received from the program memory 42 via the control line 55. For example, if the custom tape product is to be an eight track cartridge (four stereo tracks), then four stereo lines 60 would be simultaneously selected by the audio switch 28 or 29 and four stereo program units recorded simultaneously in eight tracks by the slave recorder 21 or 22.

At the completion of the program group being played back by the selected reproducers 20, a cue tone signal is sent via the cue tones bus 62 to the system control. Thereupon, the program counter is incremented by one, and the program address stack steps to the next address which is sent to the program address 42. The memory then sends the new address data via the line 55 to the location decoder whereupon different playback reproducers are selected. This procedure follows until all of the selections have been placed onto the tape threaded on the slave recorders 21 and 22. During the same time, the label printer has typed upon labels the identification of the songs or program units being recorded at the slave recorders. Upon completion of the last selection to be included in each customized program tape, the system may stop and require reset for the next custom program operation, or it may automatically proceed to the next custom tapes and repeat the foregoing sequence.

It is to be understood that the system shown in FIG. 2 is essentially a monaural system and would be duplicated in the requisite number of channels to accommodate two track stereo and four track quadraphonic customized tape production. The principles remain the same and are well understood by those skilled in the art.

It should also be understood that the printer 26 may receive addressing information from the program memory 42 and print mailing labels and other information. In this regard the system 10 may easily include counters for tabulating the total number of playbacks of each program unit so that royalties may be automatically accounted for and reported by periodic listings made by the printer 26.

It will be appreciated that selections may be continuously removed from the master playback matrix 20 and replaced with other selections from time to time. In this event, the new information is typed via the input terminal keyboard 16 into the program identification location memory 42 at the appropriate address of the playback unit in which the new cartridge is loaded. Alternatively, a matrix loading plan may be stored in memory, and automatically change the information as the cartridges 30 are changed at the matrix 20. This alternative arrangement would automatically indicate at the terminal display which cartridges 30 to change and when to change them.

RETAIL SALES CUSTOM TAPE PRODUCTION SYSTEM 100

Figure 5:
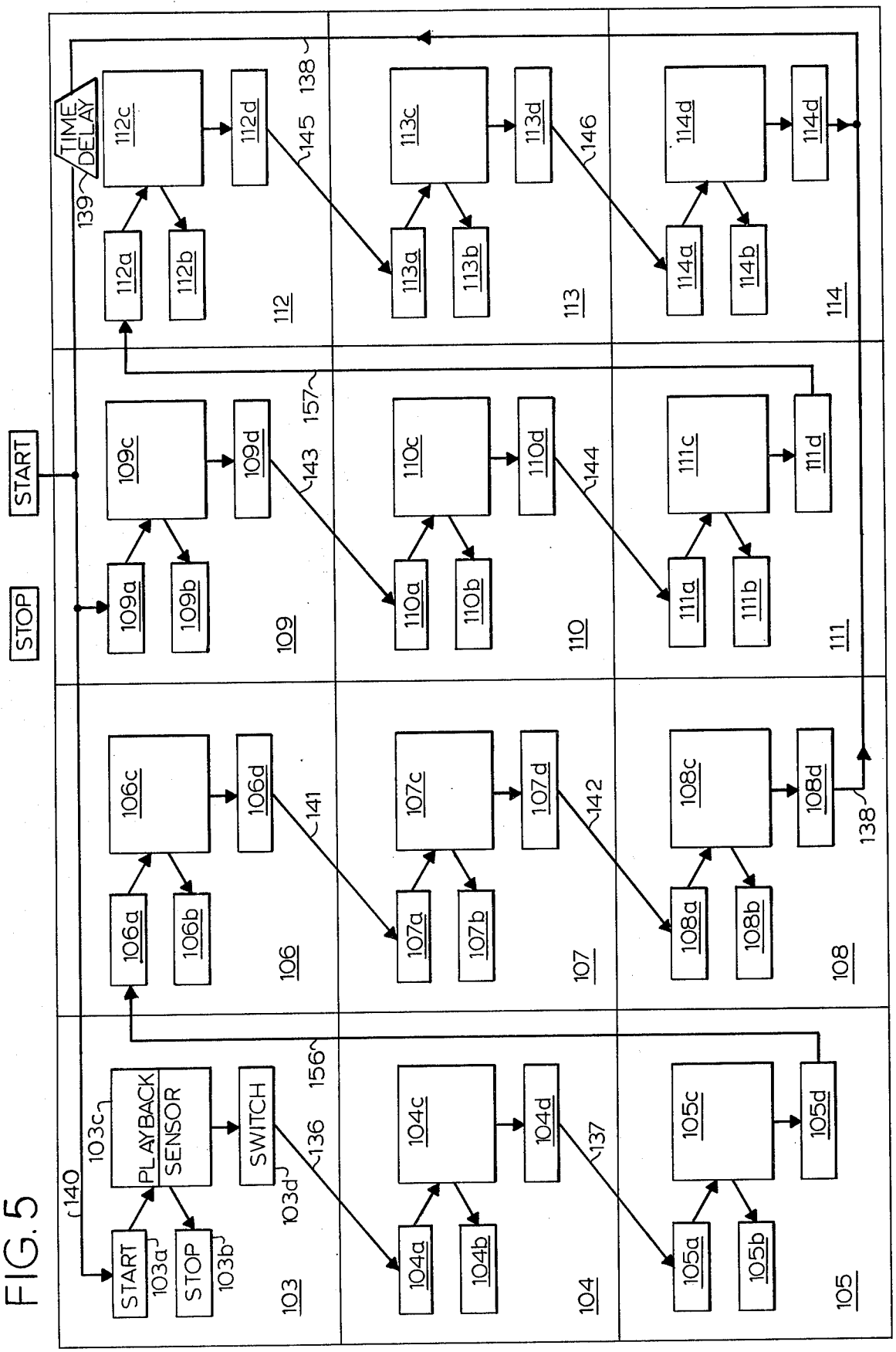
FIG. 5 is a detail block diagram of the control circuitry of the system of FIG. 3 configured for production of custom cassette tape cartridges.

A reduced capacity customized tape record production system 100 is shown in FIGS. 3, 4 and 5. This system 100 is less elaborate than the larger system 10 described in connection with FIGS. 1 and 2, yet both systems 10 and 100 embody the principles of the present invention. The system 100 is intended primarily for production of customized tapes at the point of retail tape sales, such as a record store.

Referring now to FIG. 3, the system 100 includes an array 102 of twelve master playback units arranged in four vertical columns of three units each. Thus, the array 102 includes playback units 103, 104 and 105 in the first (left) vertical column, playback units 106, 107 and 108 in the second vertical column, units 109, 110, and 111 in the third column, and units 112, 113 and 114 in the fourth column. Each unit is loaded with a broadcast cartridge 116 prerecorded with a predetermined program unit, such as one popular song, etc. Each cartridge 116 is preferably recorded in two track stereo, but may also be monaural or quadraphonic, etc. Also each program unit may be recorded in both forward and reverse directions on each cartridge 116 to enable simultaneous recording of customized cassettes.

The array 102 includes a control panel 118 in which a mode selector switch 120, and other switches and indicators are mounted. Extending from the array are three program cables 121, 122 and 123. The cable 121 leads to a first cassette slave recorder 124 and interconnects the recorder 124 with the array 102. The cable 122 leads to a second cassette slave recorder 125 and interconnects the recorder 125 with the array 102. Each of the cables 121 and 122 carries, e.g., four program lines (four monaural, two stereo or one quadrophonic program channel(s)), as standard tape cassettes have four recording tracks, two of them being in a first or forward direction and the other two being in a second or reverse direction. The cable 123 includes eight program lines which are duplicates of the lines carried in both of the cables 121 and 122, and leads to an eight track slave recorder 126 which may be the same as the recorders 21 and 22 of the system 10.

The system 100 has the capability of simultaneously recording two separate and distinct customized cassettes 128 and 129 with the cassette recorders 124 and 125, or recording a single eight track tape 130 with the recorder 126. As with the system 10, the system 100 preferably records eight track tapes from a supply 131 of coiled but unreeled tape installed on the recorder 126. All eight tracks of the tape 130 are recorded simultaneously with programs supplied by simultaneous playback of a maximum of four of the playback units 103–114, one unit per vertical column. Thus, four stereo programs are recorded on the eight track tape 130 at once. After the eight track tape 130 is recorded, it is manually loaded into an eight track cartridge (not shown). Alternatively, the recorder 126 may be designed to handle blank eight track cartridge tapes.

Mode selection between production of the two separate cassettes 128 and 129 and the single eight track tape 130 is accomplished by manual operation of the selector switch 120. It will be appreciated that two of the tracks of the cassette tapes 128 and 130 will have to be recorded backwards, if all four tracks are to be recorded simultaneously. This is not a problem, since some or all of the playback cartridges 116 will have selections which are prerecorded backwards as well as forwards. The switch 120 functionally selects between the control configuration shown in FIG. 4 and in FIG. 5 and may also select between forward and backward playback tracks of the units 103–114.

The control circuitry of the system 100 in the eight track mode is shown in FIG. 4. This figure diagrams each playback unit within the array 102 as including a start control circuit a, a stop control circuit b, a playback cue tone sensor circuit c, and a switcher circuit d. Thus, the playback unit 103 includes a start control circuit 103a, a stop control circuit 103b, a playback cue tone sensor circuit 103c, and a switcher circuit 103d. In like manner, each of the other playback units 104–114 includes the same circuits a, b, c, and d.

The units of each vertical column of the array 102 are wired to operate in tandem, sequentially in the eight track mode. Thus, upon completion of playback of a cartridge 116 by the unit 103, a prerecorded cue tone is sensed by the sensor 103c and activates the switcher circuit 103d. The switcher 103d is connected via a control line 136 to the start circuit 104a and automatically starts playback of the unit 104. At completion of playback of the unit 104, a cue tone is sensed by the sensor 104c, the switcher 104d is then activated, and the unit 105 is then started by a signal sent via a control line 137 interconnecting the switcher 104d and the start circuit 105a.

At the completion of playback of the unit 105, a cue tone is sensed by the sensor 105c and the switcher 105d puts out a control signal on a common control line 138 which leads to a time delay circuit 139. Also connected to the common control line 138 are the switchers 108d, 111d and 114d, the switchers of the bottommost units 108, 111 and 114, of the other three vertical columns. The delay circuit 139 is essentially a counter: it counts each of the four control signals from the switchers 105d, 108d, 111d and 114d and puts out a start again signal only after the fourth signal is received and counted and after a predetermined delay period. Then, each top unit 103, 106, 109 and 112 of the four vertical columns is sent a single delayed restart pulse from the delay circuit 139 via a common line 140 to the start circuit 103a, 106a, 109a and 112a, and another eight track tape may be custom programmed alternatively, the system 100 may be set up to wait upon completion of playback of the lowermost units 105, 108, 111 and 114 until a start button 152 is depressed and the programming cycle is repeated.

It should be noted that the interconnections of the units of the other vertical columns are symmetrical to the interconnections shown in FIG. 4 and discussed above in connection with the units 103, 104 and 105 of the first column. Thus, a line 141 interconnects the switcher 106d and the start circuit 107a, and a line 142 interconnects the switcher 107d and the start circuit 108a. A line 143 interconnects the switcher 109d and the start circuit 110a, and a line 144 interconnects the switcher 110d and the start circuit 111a. A line 145 interconnects the switcher 112d and the start circuit 113a, and a line 146 interconnects the switcher 113d and the start circuit 114a.

In operation, each of the units 103-114 is first loaded with a broadcast cassette 116 (NAB type A or B) prerecorded with a different program selection. Each program unit is selected and edited to be of a standardized duration, and a cue tone is recorded on a control track at the end of the program selection. Thus, each unit 103-105 of the first column will be playing back during substantially, but not exactly, the same time period as each other parallel unit 106-114 of the other three vertical columns. When all of the units 103-114 have played back, twelve predetermined program selections have been recorded by the slave recorder 126, and the delay circuit places a pause in the tape 130 of sufficient length to enable splicing of ends together, after the tape 130 has been loaded into an eight track cartridge housing.

The recorder 126 may be provided with an automatic tape shear 151 which will cut off the tape 130 from the pancake supply 131 when a signal is received from the delay circuit 139 that indicates that custom programming of the tape 130 is completed and that the splicing length has passed by. An operator quickly removes the cut quantity of tape 130 from the take up of the recorder 126 and threads the remaining loose end of tape about a new hub installed on the pickup. The hub that is used is preferably the hub which will hold the tape in the finally assembled and spliced tape cartridge housing.

The master start switch 152 and a master stop switch 153 may be included in the control panel 118. The start switch 152 is electrically connected to the control line 140 and to the slave recorders 124, 125 and 126, and when pressed starts the operation of the system 100 by starting the playback units 103, 106, 109 and 112 and the slave recorders 124, 125 or 126 depending upon which is being used. The stop switch is connected in parallel to each of the individual stop circuits 103b-114b of the units 103-114 and to the slave recorders 124, 125 and 126, and when depressed stops all operations of the system 100.

The cassette programming mode interconnection is shown in FIG. 5. A difference between the configuration of FIG. 4 and that shown in FIG. 5 is that the units are connected in two tandems of six apiece, thus the units 103, 104, 105, 106, 107 and 108 form a left side tandem and the units 109, 110, 111, 112, 113, and 114 form a right side tandem. These connections are accomplished by a control line 156 which interconnects the switcher 105d and the start circuit 106a to form the left tandem, and by a control line 157 which interconnects the switcher 111d and the start circuit 112a to form the right tandem. The line 138 remains connected to the switcher 108d and 114d, and the line 140 remains connected to the start circuits 103a and 109a.

Each tandem is connected to one of the cassette recorders 124, 125. Two cassettes may therefore be made simultaneously, with two tracks being recorded at any one time. Once six selections are programmed on both tapes 128, 129, the cassette recorders 124, 125 are stopped, and the cassettes 128 and 129 are reversed. Then the other two tracks are recorded on the cassettes 128 and 129.

Alternatively, one four track cassette recorder may be sent four tracks simultaneously; however, two of the tracks must be recorded (and hance be played back) backwards.

The system 100 may include hidden counters, accessible and readable only by service personnel. The counters would respond to visual identifying signals on the cue track of each prerecorded cassette 116 and tabulate the number of playbacks of each cassette 116. In this way accurate accounts of accrued royalties may be kept, without alerting store personnel or others to the fact that tabulations are being made of each playback.

Preprinted separate single line labels for each selection available may be provided with each prerecorded tape 116 for use by the retailer in producing custom tapes. Each line label would include the name of the selection and would be printed on a peelable pressure sensitive strip. A blank master label would be affixed to the tape 128, 129 or 130 being customer programmed. The master label would then be filled in by adhering line labels thereto in order of the program units custom recorded on the tape.

To those skilled in the art, it will be apparent that the order of the program units recorded will depend upon the order in which the custom tape cartridges 116 are loaded into the array 102.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A system for making customized multiple selection, multiple track magnetic tape records by recording the playback from an array of separately playable tape recorded selections, said system comprising in combination a plurality of magnetic tape cartridges, each being prerecorded with a predetermined selection, a playback array for receiving and selectively playing back said cartridges in an order selected to provide customization of said records being made with at least two of said cartridges being played back simultaneously, at least one multiple track tape recorder connected to said playback array and loaded with a supply of magnetic tape sufficient to provide at least one of said custom recorded magnetic tape records, said tape recorder receiving the simultaneous playback of said selected cartridges of said array and for recording thereof on plural tracks of said magnetic tape supply, control means operatively connected to said array and to said tape recorder for starting playback operation of said array and recording operation of said tape recorder and for automatic switching of said tape recorder and said array to a next cartridge in order in said array after each cartridge completes playback.

2. The system set forth in claim 1 wherein each said selection prerecorded on a said magnetic tape cartridge is of a standardized time duration.

3. The system set forth in claim 1 including a plurality of multiple track tape recorders connected to said playback array for making a plurality of said customized tape records simultaneously.

4. The system set forth in claim 1 further comprising variable-length audio delay means connected to at least one of said plurality of multiple track tape recorders for delaying playback by varying times to accommodate in proper time sequence successive selections of differing duration.

5. The system set forth in claim 1 further comprising label printer means connected to said control means for printing labels for said customized tape records, each said label for a said customized tape record being printed with a listing of selections recorded thereon in order of recording.

6. The system set forth in claim 1 further comprising tape cutter means mounted at said tape recorder and connected to said control means, said tape cutter means for cutting tape threaded on said recorder after a said customized tape record has been made.

7. The system set forth in claim 1 wherein said playback array includes at least twelve separately operable playback units, and wherein there are at least twelve said prerecorded magnetic tape cartridges in said array.

8. The system set forth in claim 7 configured for making customized eight-track magnetic tape records, wherein said playback array is connected to play four units back simultaneously, and wherein said control means automatically advances said array to a succeeding unit upon completion of playback of each said unit until said customized tape record is made, whereupon said control means stops said array.

9. The system set forth in claim 7 configured for making customized four-track cassette magnetic tape records, wherein said playback array is connected to play two units back simultaneously, and wherein said control means automatically advances said array to a succeeding unit upon completion of playback of each said unit until said control means stops said array.

10. Apparatus for automatic high speed mass recording of custom magnetic medium records, each custom record having a plurality of customer preselected entertainment selections in a customer preselected order comprising:

a multiplicity of playback units, each unit being prerecorded with an available entertainment selection;
randomly accessible playback matrix means for holding and playing back said playback units at a high speed much higher than customer equipment playback speed in an order for each said record corresponding to said preselected entertainment selections in said preselected order therefor;

high speed recorder means connected to said playback matrix means and having a supply of magnetic recording media to provide a medium to be recorded at said high speed with the playback of said customer preselected plurality of entertainment selections in said preselected order thereby providing each said custom record;

automatic controller means operatively connected to said high speed playback matrix means and to said high speed recorder means, for receiving and storing batches of data for a plurality of said records to be custom made, said data corresponding to said customer preselected entertainment selections and sequences for each said record, said controller means repeatedly automatically selecting and operating said playback matrix means in accordance with said data for each said record and simultaneously operating said recorder to make each said record until all said custom records specified by said data batch have been mass recorded; and data input means operatively connected to said controller means for inputting batches of said data from time to time during mass recording operation of said apparatus to enable it to mass record said custom records substantially continuously.

11. The apparatus set forth in claim 10, further comprising label printer means connected to said controller means for printing upon a blank record label loaded therein a listing of said preselected entertainment selections in said preselected order to provide a customized label for each said record, said label being adapted to be affixed to a container containing said custom record.

12. The apparatus set forth in claim 10 wherein said playback matrix means plays back a plurality of playback units simultaneously, and further comprising a plurality of high speed recorder means connected simultaneously to said playback matrix means and a supply of magnetic recording media for each said recorder means, said controller means being operatively connected to each said recorder means so that each is simultaneously provided with different preselected entertainment selections in a preselected order for simultaneous mass recording of custom magnetic medium records.

13. The apparatus set forth in claim 12 further comprising variable-length playback delay means connected between said playback matrix means and at least one of said plurality of recorder means for delaying playback to said one recorder means of one entertainment selection from said playback matrix means by a length sufficient to enable a preceding playback of another entertainment selection to said one recorder means to be completed so that a single playback of said one entertainment selection by said playback matrix means may be recorded at different times by said one recorder means as well as another of said plurality of recorder means which first received playback which first received playback of said one entertainment selection, whereby simultaneous playback of entertainment selections of differing durations may be recorded by said plurality of recorder means without overlap of selections and excessive pauses therebetween in any custom record being mass produced.

14. The apparatus set forth in claim 10 further comprising automatic magnetic media cutter means in connection with said high speed recorder means and controlled by said automatic controller means for severing each recorded magnetic medium record from said supply of magnetic recording media.

15. A method for mass producing customized multiple selection, multiple track magnetic records automatically and at high speed by recording playbacks of entertainment units selected from a bank of available units, said method comprising the steps of:
prerecording each said entertainment unit on a single, separately accessible recording,
loading each said recording into a high speed playback matrix,
interconnecting said playback matrix with a magnetic recorder through an automatic switching network,
loading said recorder with a supply of unrecorded magnetic record media,
presetting said automatic switching network to select automatically between recordings sequentially to provide for a plurality of said custom records the particular entertainment units in the particular sequence specified for each,
starting said recorder and said matrix,
playing back recordings in said playback matrix in present automatic sequence at high speed much higher than user speed while simultaneously sequentially recording said entertainment units at high speed onto said magnetic record media by automatically changing connections between said playback matrix and said recorder between recordings with said automatic switching newwork to provide said plurality of mass produced customized records.

16. The method set forth in claim 15 further comprising the steps of providing a plurality of recorders interconnected with said matrix, delaying said playback in a variable length delay connected at one of said recorders until playback of the preceding recording is completed and thereupon sending said delayed playback to said delay connected recorder whereby entertainment units having different time durations may be playback and simultaneously recorded on said plurality of recorders without overlap and excessive pause between units included in any custom record being mass produced.

17. The method in claim 15 further comprising the step of automatically making a label for each said magnetic tape record which identifies in sequence the entertainment units custom recorded on said record, said label being made in accordance with a control signal that selects the sequence of playback of said matrix.

18. The method in claim 15 further comprising the step of tabulating the total number of playbacks of each said recording whereby royalties accrued on account thereof may be known and paid.

19. The method set forth in claim 15 including the steps of
providing a multiplicity of separate prerecorded media, each having recorded thereon at least one entertainment unit;
loading some of said media into said playback matrix to make some of said records;
changing some of said media from time to time to make others of said customized records.

20. A system for the automatic high speed mass production of customized multiple entertainment selection magnetic media records, comprising:
a plurality of discrete, separately playable magnetic reproduction units, each unit being prerecorded with a said entertainment selection and provided with a cue means for signalling a cue at the end of said selection thereon,
a plurality of high speed player means for receiving said reproduction units, each said player means for playing back said entertainment selection and cue on the unit therein at a speed much faster than user playback speed,
customizing selection means interconnecting each of said plurality of player means and preset with a batch of customizing playback sequences for the custom records to be produced, said selection means for automatically sequentially selecting and connecting each said reproduction unit in accordance with said preset sequence and for responding to a cue from a said player means presently operating by automatically starting the operation of a preselected next player means so that said selections are played back in accordance with said customizing sequence,
high speed recorder means connected to said plurality of player means and provided with a supply of unrecorded magnetic media, said recorder means for receiving playback from each said selected and operating player means and for recording said playback at said high speed onto said media, thereby producing said customized multiple selection magnetic media records.

21. The system set forth in claim 20 wherein said customizing selection means further includes starting and stopping control means for starting a first said player means and for stopping said system upon end of playback of a last said player means.

22. The system set forth in claim 20 further comprising label generating means connected to said customizing selection means, said label generating means for storing the title of each reproduction unit and the player means in which it is located, and for automatically printing a label for said record listing each said title in order of said customizing sequence.

23. The system set forth in claim 20 further comprising media cutter means at said recorder means and connected to said customizing selection means, said media cutter means for cutting said media supplied at said recorder means after said customized record has been produced.

24. A high volume, high speed recording system for recording magnetic media entertainment records, each record being provided with multiple entertainment programs selected and recorded in order specified by the customer, said system comprising:
a multiplicity of discrete self contained, separately playable magnetic reproduction units, each unit being prerecorded with a said entertainment program and provided with a cue means for signalling a cue at the end of playback of said program thereon,
a plurality of high speed player means for said reproduction units, each said player means for automatically playing back a said entertainment program and cue means on the reproduction unit leaded therein upon receipt of a start-playback signal at a speed much faster than user playback speed, and for manually ejecting played units and receiving unplayed units in periods of nonplayback during system operation;
customizing selection means interconnecting each of said high speed player means and preset with a customizing playback sequence, said selection means for responding to a signalled cue from a said player means presently operating by automatically generating and sending a said start-playback signal to a preselected next player means so that said entertainment programs are played back serially in accordance with each said customer selection and order for each said custom record being recorded;

high speed recorder means connected to said plurality of player means and provided with a supply of unrecorded magnetic media, said recorder means for receiving said serially ordered playbacks from said plurality of player means and for recording said playbacks at said high speed onto said media, thereby producing said customer selected and ordered records and, record separator means for separating each record from said supply of unrecorded magnetic media following production thereof.

25. The system set forth in claim 24 wherein said customizing selection means comprises a prearranged pattern of wiring interconnecting said plurality of high speed player means.

26. The system set forth in claim 24 wherein said customizing selection means includes:

input terminal means for enabling input of batches of said customizing sequences for each said record and for other information;

customizing sequence data memory means connected to said input terminal means and to said plurality of player means, for receiving, storing and automatically putting out said customizing sequence for each said record being produced, so as to operate in said sequence each said player means.

27. The system set forth in claim 26, wherein said memory means includes a program identification and location memory, a program address stack; a program counter connected to count across said program address stack, a system control connected to said player means and responsive to said cue for operating said program counter upon receipt of each said cue, and a location decoder interconnecting said program identification and location memory and said plurality of said player means for operating each player means in said customizing sequence as stored in said program identification and location memory.

28. The system set forth in claim 27, further comprising a label printer operatively connected to said program identification and location memory for printing a label of titles of said programs in said customizing sequence for each said record.

29. A system for the automatic high speed production of a customized multiple entertainment selection magnetic media record, comprising:

a plurality of discrete, separately playable magnetic reproduction units, each unit being prerecorded with said entertainment selection and provided with a cue means for signalling a cue at the end of said selection thereon, a plurality of high speed player means for receiving said reproduction units, each said player means for playing back said entertainment selection and cue on the unit therein at a speed much faster than user playback speed, customizing selection means interconnecting each of said plurality of player means and preset with a customizing playback sequence for the custom record to be produced, said selection means for responding to a cue from a said player means presently operating by automatically starting the operation of a preselected next player means so that said selections are played back in accordance with said customizing sequence, high speed recorder means connected to said plurality of player means and provided with a supply of unrecorded magnetic media, said recorder means for receiving playback from each said selected and operating player means and for recording said playback at said high speed onto said media, thereby producing said customized multiple selection magnrtic media record, and media cutter means at said recorder means and connected to said customizing selection means, said media cutter means for cutting said media supplied at said recorder means after said customized record has been produced.

30. The system set forth in claim 29 wherein said customizing selection means further includes starting and stopping control means for starting a first said player means and for stopping said system upon end of playback of a last said player means.

31. The system set forth in claim 29 further comprising label generating means connected to said customizing selection means, said label generating means for storing the title of each reproduction unit and the player means in which it is located, and for automatically printing a label for said record listing each said title in order of said customizing sequence.

* * * * *